United States Patent [19]

Patel et al.

[11] Patent Number: 4,948,595

[45] Date of Patent: Aug. 14, 1990

[54] SPEARMINT ENHANCED PEPPERMINT FLAVORED CHEWING GUM WITH IMPROVED STABILITY

[75] Inventors: Mansukh M. Patel, Downers Grove; Jayant C. Dave, Bloomingdale, both of Ill.

[73] Assignee: Wm. Wrigley Jr. Company, Chicago, Ill.

[21] Appl. No.: 374,275

[22] Filed: Jun. 30, 1989

[51] Int. Cl.$^5$ ............................................. A23G 3/30
[52] U.S. Cl. .................................... 426/3; 426/651; 426/534
[58] Field of Search ....................... 426/3–6, 426/650, 651, 534, 535

[56] References Cited

U.S. PATENT DOCUMENTS

| 4,045,581 | 8/1977 | Mackay et al. | 426/3 |
| 4,157,385 | 6/1979 | Wagenknecht et al. | 426/3 |
| 4,157,401 | 6/1979 | Stroz et al. | 426/3 |
| 4,242,323 | 12/1980 | Vlock | 426/3 |
| 4,423,030 | 12/1983 | Hayes | 426/3 |
| 4,440,790 | 4/1984 | Backwell et al. | 426/3 |
| 4,456,621 | 6/1984 | Blackwell et al. | 426/3 |
| 4,476,142 | 10/1984 | Netherwood et al. | 426/3 |
| 4,478,864 | 10/1984 | Blackwell et al. | 426/534 |
| 4,708,880 | 11/1987 | Hussein | 426/424 |
| 4,724,151 | 2/1988 | Mansukhami et al. | 426/3 |
| 4,752,481 | 6/1988 | Dokuzovic | 426/3 |
| 4,844,883 | 7/1989 | Patel | 426/6 |

Primary Examiner—Jeanette Hunter
Attorney, Agent, or Firm—Willian Brinks Olds Hofer Gilson & Lione

[57] ABSTRACT

The present invention includes a method of enhancing the flavor of a peppermint flavored chewing gum by the addition of a minor amount of a flavor enhancer consisting of spearmint flavor and methyl salicylate combined with a peppermint flavoring agent to form the peppermint flavor mixture for the chewing gum. The amount of spearmint flavor and methyl salicylate comprises about 0.1 to about 2 of the total mixture of peppermint flavor mixture added to the chewing gum. In addition, the ratio of spearmint flavor to methyl salicylate is between about 10:1 to about 2:1.

18 Claims, No Drawings

SPEARMINT ENHANCED PEPPERMINT FLAVORED CHEWING GUM WITH IMPROVED STABILITY

BACKGROUND OF THE INVENTION

The present invention relates to chewing gum and methods for producing it. More particularly, the invention relates to an enhancement of the flavor profile of peppermint flavored chewing gum.

Of all the flavors incorporated into chewing gum, mint flavors have been some of the most popular. Most widely used have been peppermint and spearmint as well as blends of the two. Typically, peppermint and spearmint flavors are added to chewing gum in the form of essential oils. Peppermint oil is derived by distillation of the aerial parts of the perennial herb *Mentha piperita* L. Oil of Cornmint, derived from *Mentha arvensis* L. var *piperescens*, can also be blended with peppermint oil. Oil of Spearmint is derived from distillation of several species and varieties of the genus Mentha. The principle species and varieties are *Mentha spicata* L. and *Mentha verticillata*, and *Mentha cardiaca*.

The flavor profiles of these mints in chewing gum are somewhat complex in nature. Accordingly, much research has been carried out to optimize the flavor effects of these mints. For example, U.S. Pat. No. 4,613,513 discloses a process wherein essential oils such as spearmint oil and peppermint oil are treated with a small amount of a mild oxidizing agent, a Fehlings solution, to remove harsh flavor notes. Similarly, U.S. Pat. No. 4,708,880 describes a process wherein harsh flavor notes are removed from peppermint and spearmint oil by treatment with a peroxide-acid reagent.

A flavor enhancer for mint flavored chewing gums is described in European Patent Application No. 87810165. This reference discloses a flavor enhancer comprising a derivative of soy which is reported to reduce the bitter or harsh flavor notes perceived after substantial chewing.

European Patent Application No. 87810601 discloses a method of enhancing the perceived breath freshening effects of a mint flavored chewing gum. The disclosed composition includes peppermint and/or spearmint oil with a specified menthol content; a spray dried peppermint and/or spearmint oil; and spray dried menthol.

A series of patents including U.S. Pat. Nos. 4,456,621, 4,440,790, 4,476,142, and 4,478,864 all teach a method of enhancing the flavor of peppermint gum. The flavor is improved by reacting maleic anhydride with menthofuran, an oxidative contributor, found in peppermint oil.

SUMMARY OF THE INVENTION

The present invention includes a method of enhancing the flavor of a peppermint flavored chewing gum by the addition of a minor amount of spearmint flavor and methyl salicylate to the chewing gum. The invention also includes the peppermint flavored chewing gum with spearmint flavor and methyl salicylate added in a minor amount. The chewing gum of the present invention includes a gum base, a sweetener, a peppermint flavoring agent, and a peppermint flavor enhancer consisting of a combination of spearmint flavor and methyl salicylate. The amount of spearmint flavor and methyl salicylate ranges from about 0.1% to about 2% of the total peppermint flavor mixture added to the base gum. Furthermore, the ratio of the spearmint flavor to methyl salicylate is between about 10:1 to 2:1.

In accordance with a preferred embodiment, the blend of the methyl salicylate and spearmint flavor is about 0.4% of the total peppermint flavor mixture added to the gum. In addition, the peppermint flavoring agent is preferably a blend of natural or synthetic peppermint. Also, the peppermint flavor mixture, i.e., combined peppermint flavoring agent and the spearmint oil and methyl salicylate are included in the gum at a level of about 1.5 weight percent of the chewing gum.

At the relatively low level at which the mixture of spearmint flavor and methyl salicylate is used in the present invention, it should not contribute a spearmint taste to the chewing gum. However, it has been found that at this low level, the blend contributes to the overall flavor of the peppermint flavored chewing gum in such a way as to enhance the peppermint flavor of the chewing gum. In particular, the enhancement has been described as making the peppermint taste stronger, fuller, sweeter and cooler.

It has also been found that the addition of a small amount of spearmint flavor and methyl salicylate may increase the shelf stability of the flavor of a peppermint flavored chewing gum. While not wishing to be bound by any particular theory, it is currently believed that the added blend retards the oxidation of the synthetic or natural peppermint which in turn retards the aging of the gum from a flavor standpoint.

As used in this specification and the appended claims, the term "peppermint flavored chewing gum" is intended to refer to a chewing gum which has peppermint as its dominant flavor.

Unless otherwise noted all percentages in this specification and appended claims are percentages by weight.

DETAILED DESCRIPTION OF THE PREFERRED EMBODIMENTS

The peppermint flavored chewing gum of the present invention includes a gum base, a sweetener, a peppermint flavoring agent with a minor amount of spearmint flavor and methyl salicylate.

Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, and the like. Of these, polyisoprene, isobutylene and isobutylane-isoprene copolymer are preferred, with the copolymer being the most preferred. A copolymer obtained from Exxon Corp. under the designation "butyl rubber" is suitable for use in the most preferred embodiment.

The amount of elastomer used in the gum base can typically be varied between about 10 and about 20 percent depending on the specific elastomer selected and on the physical properties desired in the final gum base. For example, the viscosity, softening point, elasticity can be varied.

Resins used in gum bases include polyvinyl acetate, polyethylene, ester gums, (resin esters of glycerol) and polyterpenes. Of these, ester gums, polyethylene, and polyvinyl acetate are preferred, with a combination of polyvinyl acetate and ester gums being most preferred. A polyvinyl acetate obtained from MONSANTO under the designation "Gelva" is a suitable polyvinyl acetate for use in the most preferred embodiment.

As with the elastomer, the amount of resin used in the gum base can be varied depending on the particular resin selected and on the physical properties desired in the final gum base.

Preferably, the gum base also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. The amount of plasticizers used can vary between about 10 and 40 percent.

The most preferred embodiment uses a mixture of paraffin wax and partially hydrogenated vegetable oil and glycerol monostearate.

The gum base preferably includes a filler component. A filler component is preferably selected from the group consisting of calcium carbonate, magnesium carbonate, talc, dicalcium phosphate and the like. The filler may constitute between about 5 to about 60 percent by weight of the gum base. The filler may comprise about 5 to about 50 percent by weight of the gum base.

Further, gum bases may also contain optional ingredients such as antioxidants, colors, and emulsifiers.

These ingredients of the gum base can be combined in a conventional manner. In particular, the elastomer, resins, plasticizers and the filler, are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably, the insoluble gum base comprises between 10 and 50 percent by weight of the gum and most preferably about 20 to about 35 percent by weight of the gum.

In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the gum base portion is retained in the mouth throughout the chew.

In the most preferred embodiment, the invention is used in a sugarless chewing gum. Generally sugarless sweeteners include components with sweetening characteristics but are devoid of the commonly known sugars and comprise but are not limited to high-potency sweeteners and/or sugar alcohols. Suitable high-potency sweeteners include aspartame, alitame, salts of acesulfame, saccharin and its salts, cyclamic acid and its salts, glycyrrhizin, sucralose, thaumatin, and monellin, as well as combinations thereof.

Suitable sugar alcohols include sorbitol, mannitol, xylitol, hydrogenated starch hydrolysates, maltitol, and the like, as well as combinations thereof. Preferably, the sugarless gum comprises a combination of a high-potency sweetener with a sugar alcohol, most preferably aspartame with sorbitol. In a preferred embodiment, the water soluble portion is a mixture of sorbitol at about 50 percent, mannitol at about 8 percent, and Lycosin at about 7 percent of the final chewing gum mixture.

In an alternative embodiment, the invention is used in a sugar based peppermint flavored chewing gum. The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. The softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. Preferably, the chewing gum contains about 9 percent glycerine.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

According to the present invention, the chewing gum includes a peppermint flavoring agent to give the gum a peppermint taste. Typically, the overall peppermint flavor mixture content of the chewing gum will be in the range of about 0.1 to about 2.0 weight percent of the gum. Preferably, the flavor mixture will be about 1.5 weight percent.

The peppermint flavoring agents may comprise either natural or synthetic peppermint oils, and preferably blends of natural and synthetic. The peppermint flavor mixture usually comprises from about 98 to about 99.9 weight percent of the flavor mixture and from about 0.1 to about 2 weight percent peppermint flavor enhancer. In a preferred embodiment, the peppermint flavor mixture is a blend of 99.6 weight percent peppermint flavoring agent and 0.4 weight percent peppermint flavor enhancer.

The peppermint flavor enhancer is a blend of spearmint flavor and methyl salicylate. The peppermint flavor enhancer should range from about 0.033% to about 0.5% methyl salicylate and 0.1% to about 1.5% spearmint flavor agent of the weight percent of the total peppermint flavor mixture. In the preferred embodiment of this invention, the spearmint flavor comprises spearmint oil. The ratio of spearmint flavor to methyl salicylate can vary between about 10 to 1 to about 2 to 1. Preferably, the ratio of spearmint flavor to methyl salicylate is 3 to 1.

The active ingredient imparting flavor to the spearmint oil is L-carvone. In this invention's most preferred embodiment, the L-carvone should constitute about 55% of the spearmint oil. The ratio of L-carvone to methyl salicylate can range from about 5 to 1 to about 1 to 1. Outside this range, there is a decline in the peppermint flavor quality.

Additionally, menthol constitutes about 50% of the peppermint oil; therefore, the ratio of menthol to L-carvone is also significant. The minimum ratio of menthol to L-carvone at which a noticeable difference in the taste of the peppermint flavor would be observed is about 60 to 1 and the maximum ratio showing an effect would be about 500 to 1. It should be stressed that in the preferred embodiment, the L-carvone to methyl salicylate should be mainted in the range listed above.

Other, flavoring agents and adjuvants can also be added to the chewing gum of the present invention. For example, oils of anise, eucalyptus, clove and cinnamon. Also, flavor chemicals such as furanones which give a caramel flavor note can be added. Those skilled in the art will recognize that natural and artificial flavoring agents may be combined in any sensorally acceptable blend. All such flavors and flavor blends which result in a peppermint flavored gum ae contemplated by the present invention.

Optional ingredients such as colors, emulsifiers, and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. Most of the sorbitol bulking agent is added first. Then a softener such as gylcerin may also be added at this time along with hydrogenated starch hydrolyzate and a portion of bulking agent. The remaining portion of the bulking agent may then be added to the mixer. A flavoring agent is typically added after the final portion of the bulking agent.

The entire mixing procedure typically takes from ten to twenty minutes, but longer mixing times may sometimes be required. Those skilled in the art will recognize that many variations of the above described procedure may be followed.

EXAMPLES

EXAMPLES 1 AND 2

Examples 1 and comparative Example 2 were carried out to make a taste comparison between peppermint flavored chewing gum with a minor amount of spearmint flavor and methyl salicylate and a peppermint flavored chewing gum without the blend. Example 1 was performed as an example of the preferred embodiment of this invention. Example 1 and comparative Example 2 had the following formulae based on the total weight percent of the chewing gum:

|  | Wt. % Ex. 1 | Wt. % Ex. 2 |
| --- | --- | --- |
| Base | 24.4000 | 24.4000 |
| Sorbitol | 50.0000 | 50.0000 |
| Mannitol | 8.0000 | 8.0000 |
| Glycerin | 8.8000 | 8.8000 |
| Lycasin | 6.8000 | 6.8000 |
| Lecithin | 0.2000 | 0.2000 |
| Color | 0.0500 | 0.0500 |
| 10% Salt Solution | 0.0500 | 0.0500 |
| Aspartame | 0.2000 | 0.2000 |
| Peppermint Flavor | 1.4940 | 1.5000 |
| Spearmint Flavor | 0.0045 | — |
| Methyl Salicylate | 0.0015 | — |

-continued

|  | Wt. % Ex. 1 | Wt. % Ex. 2 |
| --- | --- | --- |
| Total | 100.0000 | 100.0000 |

The peppermint flavoring agent in comparative Example 2 consisted of 1.5 parts by weight of the chewing gum. The composition of the flavor mixture in Example 1 also consisted 1.5 parts by weight of the total chewing gum, but was composed of 0.3% spearmint oil, 0.1% methyl salicylate and 99.6% peppermint flavoring agent and a ratio of spearmint oil to methyl salicylate of 3 to 1.

The formulae above were made into batches of chewing gum by conventional means.

Upon comparing the formula of Example 1 to that of the gum without the added blend of comparative Example 2, taste experts found that the gum of Example 1 had more sweetness, cooling, and a more deep full bodied peppermint flavor.

EXAMPLES 3 AND 4

Example 3 and comparative Example 4 also were performed in order to make a taste comparison between the peppermint flavored chewing gum of comparative Example 4 and gum with the added blend of spearmint oil and methyl salicylate which was composed of 1.5 and 0.5 weight percent of the total peppermint mixture respectively. Examples 3 and 4 had the following formulae based on the total weight of the gum.

|  | Wt. % Ex. 3 | Wt. % Ex. 4 |
| --- | --- | --- |
| Base | 24.4000 | 24.4000 |
| Sorbitol | 50.0000 | 50.0000 |
| Mannitol | 8.0000 | 8.0000 |
| Glycerin | 8.8000 | 8.8000 |
| Lycasin | 6.8000 | 6.8000 |
| Lechithin | 0.2000 | 0.2000 |
| Color | 0.0500 | 0.0500 |
| 10% Salt Solution | 0.0500 | 0.5000 |
| Aspartame | 0.2000 | 0.2000 |
| Peppermint Flavor | 1.4700 | 1.5000 |
| Spearmint Flavor | 0.0225 | — |
| Methyl Salicylate | 0.0075 | — |
| Total | 100.0000 | 100.0000 |

Again, expert taste panelists taste tested and compared the gum of Example 3 which had a 3 to 1 spearmint flavor/methyl salicylate ratio to comparative Example 4 which did not have the added blend. Upon sensory evaluation, the experts found that the gum with the blend had a cooler, stronger and sweeter peppermint flavor.

EXAMPLES 5–8

Examples 5 through 8 were conducted to determine the effects upon the peppermint flavor of chewing gum by the addition of different ratios of spearmint oil and methyl salicylate while maintaining a constant ratio of peppermint flavoring agent. In Examples 5, 6, 7 and 8 the peppermint flavoring agent was maintained at 98% while the ratio of the blend was varied. The ratio of spearmint oil (S/O) to methyl salicylate (M/S) in the example and the weight percent of the two substances in the peppermint flavor mixture are shown in the following tables:

|  | Ratio | Wt. % S/O | Wt. % M/S |
|---|---|---|---|
| Example 5 | 1/3 | 0.5 | 1.5 |
| Example 6 | 3/1 | 1.5 | 0.5 |
| Example 7 | 4/0 | 2.0 | 0.0 |
| Example 8 | 2/2 | 1.0 | 1.0 |

A panel of chewing gum experts taste tested the 4 compositions of these examples to evaluate the differences in taste between various blends added to the peppermint flavor mixture and found that Example 6 had the best flavor quality giving higher cooling and sweetness. Additionally, the panel of gum experts found upon comparing Example 5 to Example 8, that both Examples had a slightly bitter, spicy flavor quality. Moreover, the panelists found, upon comparing Examples 5, 6, 7 and 8, that the Examples with the blend had a cooler, stronger and sweeter flavor than Example 7 without methyl salicylate.

EXAMPLE 9-11

Example 9 through 11 were conducted to determine the effect upon the oxidation of the peppermint flavor by the addition of the spearmint oil/methyl salicylate blend. The stability of 3 different peppermint flavors was tested to determine how the aging of the gum might be affected by the oxidation of the peppermint flavor. The flavor mixture of example 9 consisted of only natural peppermint. The flavor mixture of example 10 consisted of a composition of both natural and synthetic peppermint. Example 11 was comprised of a blend of 98% natural and synthetic peppermint, 1.5% spearmint oil and 0.5% methyl salicylate. Storage conditions were set at 100° F. to accelerate the aging of each flavor. The samples stored at 100° F. were then compared after a period of 38 days to samples stored at 40° F.

The flavor of Example 11 was found by panel experts to have the least change in aroma due to the oxidation of the peppermint.

In summary, a relatively simple and inexpensive method for enhancing the flavor of a peppermint flavored chewing gum has been described. Although specific embodiments and examples have been described herein, it should be borne in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A peppermint-flavored chewing gum comprising:
   gum base;
   sweetener; and
   peppermint flavor mixture comprising:
     a peppermint flavoring agent; and
     peppermint flavor enhancer present in an amount between about 0.1 and about 2 weight percent of the peppermint flavor mixture, wherein the peppermint flavor enhancer consists of a blend of spearmint flavor and methyl salicylate; and wherein the ratio of spearmint flavor to methyl salicylate is between about 10:1 to about 2:1.

2. The chewing gum of claim 1 wherein the ratio of spearmint flavor to methyl salicylate is 3:1.

3. The chewing gum of claim 2 wherein the spearmint flavor is comprised of about 55% L-carvone.

4. The chewing gum of claim 3 wherein the ratio of L-carvone to methyl salicylate is from about 5:1 to about 1:1.

5. The chewing gum of claim 2 wherein the ratio of L-carvone to methyl salicylate is 3:2.

6. The chewing gum composition of claim 1 wherein the peppermint flavor mixture comprises from about 99.9 to 98 weight percent peppermint flavoring agent.

7. The chewing gum composition of claim 6 wherein the peppermint flavor mixture comprises about 99.6% peppermint flavoring agent and about 0.4% peppermint flavor enhancer.

8. The chewing gum in claim 1 wherein the peppermint flavor mixture comprises about 0.1% to about 2% peppermint flavor enhancer.

9. The chewing gum of claim 1 wherein the sweetener is a high-potency sweetener selected from the group consisting of aspartame, alitame, salts of acesulfame, saccharin and its salts, cyclamic acid and its salts, glycyrrhizin, sucralose, thaumatin, and monellin, as well as combinations thereof.

10. The chewing gum of claim 9 further comprising a sugar alcohol selected from the group consisting of sorbitol, mannitol, maltitol, xylitol, hydrogenated starch hydrolysates, and mixtures thereof.

11. A method of making chewing gum comprising the steps of:
   providing a quantity of chewing gum base;
   adding a water soluble portion comprising at least a sweetener;
   adding a peppermint flavoring mixture comprising:
     a peppermint flavoring agent; and
     peppermint flavor enhancer present in an amount between about 0.1 and about 2 weight percent of the peppermint flavor mixture, wherein the peppermint flavor enhancer consists of a blend of spearmint flavor and methyl salicylate, and wherein the ratio of spearmint flavor to methyl salicylate is between about 10:1 to about 2:1.
   mixing said gum base, water soluble portion and peppermint flavoring mixture until a homogenous mass is achieved.

12. The method of claim 11 wherein the ratio of spearmint flavor to methyl salicylate is 3 to 1.

13. The method of claim 12 wherein the spearmint flavor is comprised of about 55% L-carvone.

14. The method of claim 13 wherein the ratio of L-carvone to methyl salicylate is from about 5 to 1 to about 1 to 1.

15. The method of claim 14 wherein the ratio of L-carvone to methyl salicylate is 3 to 2.

16. The method of claim 11 wherein the peppermint flavor mixture comprises about 0.1% to about 2% peppermint flavor enhancer.

17. The method of claim 11 wherein the peppermint flavor mixture comprises from about 99.9 to 98 weight percent peppermint flavoring agent.

18. The method of claim 17 wherein the peppermint flavor mixture comprises about 99.6% peppermint flavoring agent and about 0.4% peppermint flavor enhancer.

* * * * *